(12) United States Patent
Bader

(10) Patent No.: US 11,909,081 B2
(45) Date of Patent: Feb. 20, 2024

(54) CONTROL DEVICE FOR A FUEL CELLS STACK

(71) Applicant: ROBERT BOSCH GMBH, Stuttgart (DE)

(72) Inventor: Antonius Bader, Holzgerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/841,638

(22) Filed: Jun. 15, 2022

(65) Prior Publication Data

US 2022/0399555 A1 Dec. 15, 2022

(30) Foreign Application Priority Data

Jun. 15, 2021 (DE) ...................... 10 2021 206 094.3

(51) Int. Cl.
*H01M 8/04537* (2016.01)
*H01M 8/04992* (2016.01)
(Continued)

(52) U.S. Cl.
CPC ... *H01M 8/04589* (2013.01); *H01M 8/04559* (2013.01); *H01M 8/04992* (2013.01);
(Continued)

(58) Field of Classification Search
CPC ......... H01M 2250/10; H01M 2250/20; H01M 2250/30; H01M 2250/40; H01M 8/04992
See application file for complete search history.

(56) References Cited

U.S. PATENT DOCUMENTS

| | | |
|---|---|---|
| 9,269,974 B2 | 2/2016 | Matsusue et al. |
| 2006/0051628 A1* | 3/2006 | Lim ..................... H01M 8/0494 |
| | | 429/432 |

(Continued)

FOREIGN PATENT DOCUMENTS

| | | |
|---|---|---|
| DE | 11 2009 005 282 B4 | 8/2020 |
| EP | 1361620 A1 | 11/2003 |
| EP | 2846364 A1 | 3/2015 |

OTHER PUBLICATIONS

International Search Report and Written Opinion for Application No. PCT/IB2022/000345, dated Dec. 2, 2022. 14 pages.

*Primary Examiner* — Matthew W Van Oudenaren
(74) *Attorney, Agent, or Firm* — BROOKS KUSHMAN P.C.

(57) ABSTRACT

The invention relates to a control device (10) for a fuel cell stack (14), the control device being set up to actuate the fuel cell stack (14) using a predetermined current ($I_V$) and to measure the resulting voltage (U) and to compare this with a reference voltage ($U_R$). The predetermined current ($I_V$) depends on the reference voltage ($U_R$) by means of a sum of at least two exponential functions whose argument in each case contains the reference voltage ($U_R$). The control device (10) is designed to ascertain the reference voltage ($U_R$) by approximately reversing the correlation between the predetermined current and the reference voltage ($U_R$) using an iterative approximation algorithm.

14 Claims, 1 Drawing Sheet

(51) Int. Cl.
*H01M 8/04664* (2016.01)
*H01M 8/04858* (2016.01)

(52) U.S. Cl.
CPC ...... *H01M 8/0491* (2013.01); *H01M 8/04679* (2013.01); *H01M 2250/20* (2013.01)

(56) References Cited

U.S. PATENT DOCUMENTS

| | | | |
|---|---|---|---|
| 2012/0183873 A1* | 7/2012 | Matsusue | H01M 8/04649 429/431 |
| 2020/0018799 A1 | 1/2020 | Lim et al. | |
| 2020/0168928 A1* | 5/2020 | Ruf | H01M 8/04649 |
| 2020/0328433 A1 | 10/2020 | Lee et al. | |

* cited by examiner

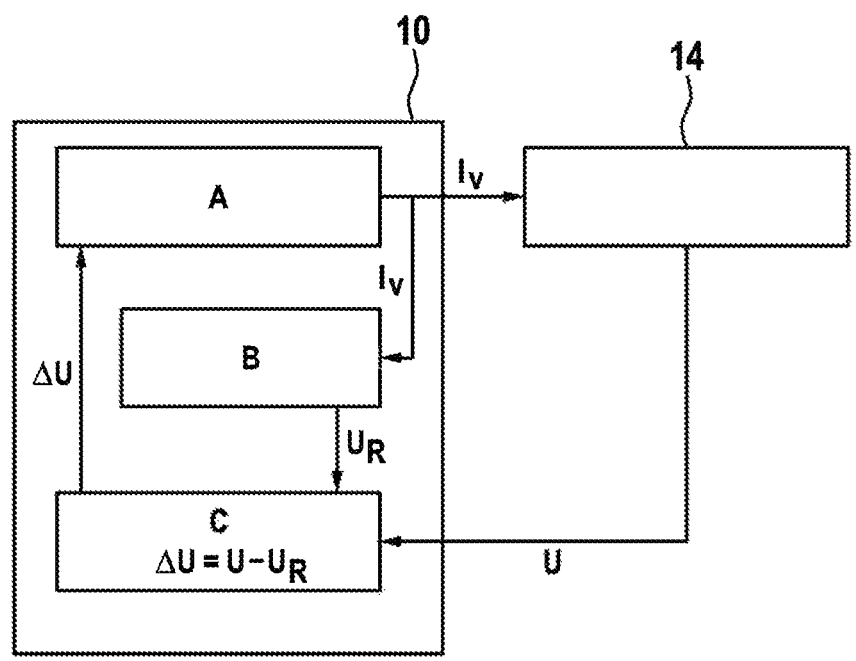

CONTROL DEVICE FOR A FUEL CELLS STACK

CROSS-REFERENCE TO RELATED APPLICATIONS

This application claims priority to German application DE 10 2021 206 094.3 filed Jun. 15, 2021. the disclosure of which is incorporated in its entirety by reference herein.

TECHNICAL FIELD

The present disclosure relates to a control device for a fuel cell stack. The disclosure relates in particular to a control device of a fuel cell vehicle.

BACKGROUND

DE 11 2009 005 282 B4 discloses a fuel cell system comprising an operating state determination device and a characteristic curve generation device. The characteristic curve generation device generates an IV characteristic curve that indicates a relationship between a current and a voltage in the fuel cell. The IV characteristic curve for the fuel cell can be generated based on, for example, rules and principles of a Butler-Volmer equation.

SUMMARY

The object of the current disclosure is to improve monitoring of the operation of a fuel cell stack in an operating mode in which the current is predetermined.

The object is achieved by using a control device for a fuel cell stack having the features as claimed in claim 1. The dependent claims which respectively refer back describe advantageous developments of the current disclosure.

BRIEF DESCRIPTION OF THE DRAWINGS

The FIGURE shows a non-limiting example of a control device for a fuel cell stack according to the current disclosure.

DETAILED DESCRIPTION

A control device for a fuel cell stack is disclosed. The control device may be set up to actuate the fuel cell stack using a predetermined current, to measure the resulting voltage, and to compare this with a reference voltage. The predetermined current depends on the reference voltage by means of a sum of at least two exponential functions whose argument in each case contains the reference voltage. The control device may be structured to ascertain the reference voltage by approximately reversing the correlation between the predetermined current and the reference voltage using an iterative approximation algorithm.

The predetermined current may be the current with which the fuel cell stack is actuated. The resulting voltage may come from the fuel cell stack at the predetermined current. The reference voltage may be a voltage that results from the approximation algorithm proceeding from the predetermined current. The quality of the approximation algorithm may be determined and may be readjusted by making a comparison of the reference voltage with the resulting voltage. As a result, the fuel cell stack may be operated more accurately at the desired operating point such that the operation of the fuel cell stack is improved.

In a preferred embodiment of the current disclosure, the control device may be designed to ascertain the reference voltage by applying the arithmetic operations of addition, subtraction, multiplication, division, and exponentiation, and also to retrieve values of logarithms from a table. It is thus possible to omit a complex processor by performing the ascertainment by simple arithmetic operations. The most simple components thus suffice for calculating the reference voltage. As a result, the space for the herein-disclosed control device may be reduced. In addition, these components are typically expensive, with the result that the herein-disclosed control device may be provided economically.

In another preferred embodiment of the current disclosure, the control device may be designed to ascertain a malfunction and/or degradation of the fuel cell stack from a deviation between the resulting voltage and reference voltage. A deviation between the voltage and the reference voltage arises when individual cells have failed or have a reduced performance. It is thus possible to infer the state of the fuel cell stack by ascertaining the deviation. The state of the fuel cell stack may thus be monitored continuously such that malfunctions may be identified at an early stage. As a result, failures of the fuel cell system may be prevented and the reliability of the fuel cell system may be increased.

The control device may be preferably designed to change the actuation of the fuel cell stack in such a way that the deviation between the resulting voltage and reference voltage is reduced. In this case, the control device may preferably adjust the iterative approximation algorithm. This has the advantage that the difference between the resulting voltage and the reference voltage may be kept to a minimum. The resulting voltage may thus be predicted relatively accurately using the predetermined current before the fuel cell stack is actuated such that the fuel cell stack may be regulated exactly. The regulation of the fuel cell stack using the control device is thus improved. The lifetime of such a fuel cell stack may also be increased as a result.

In an advantageous development, the control device may be structured to operate the fuel cell stack using the current at an operating point at which degradation of the fuel cell stack is minimized. The fuel cell stack has operating points at which parasitic reactions are at a maximum or minimum. These parasitic reactions permanently damage the fuel cell stack. An example of such a parasitic reaction is what is known as carbon corrosion, for example. Taking into account multiple Butler-Volmer equations in the control device (algorithm) at the same time may enable calculation of the rate of the parasitic reactions, which may then be minimized. The lifetime of the fuel cell stack may be increased through operation at an operating point at which these reactions are minimal. In addition, the fuel cell stack may be operated in a range in which the degree of efficiency is high.

The control device may be preferably designed to change the actuation of the fuel cell stack in such a way that the electrical power that is output by the fuel cell stack remains constant at the same specification, irrespective of the degradation. This prevents a different power resulting from the same accelerator pedal position so that irritation of a driver can be avoided.

Additionally, a fuel cell vehicle having the herein-disclosed control device is disclosed. The advantages described above are achieved using such a fuel cell vehicle.

Exemplary embodiments of the current disclosure are illustrated in the FIGURE and are described in more detail in the description below. In the FIGURE:

The FIGURE shows a non-limiting example of a control device 10 for a fuel cell stack 14. In step A, a predetermined current $I_V$ for the fuel cell stack 14 is controlled in the control device 10. The current $I_V$ is applied to the fuel cell stack 14. The current $I_V$ may in this case correspond to an accelerator pedal position in a motor vehicle. A voltage U resulting from the chemical reactions in the fuel cell stack 14 may be measured using the predetermined current $I_V$.

In step B, a reference voltage $U_R$ is calculated in the control device 10 using an approximation algorithm proceeding from the predetermined current $I_V$. For the approximation algorithm, the starting point may be the Butler-Volmer equation $y(x)=e^{ax}-e^{-bx}$, or generally $y_{(x)}=\Sigma_{i=1}^{I} a_i e^{b_i (x-x_{0i})}$. In this equation, they value corresponds to the predetermined current $I_V$ while the x value corresponds to the reference voltage $U_R$. However, the calculation of the reference voltage $U_R$ is not possible by reversing this equation.

This equation is solved iteratively by approximately reversing the correlation between the predetermined current $I_V$ and the reference voltage $U_R$ to ascertain the reference voltage $U_R$. This iterative solution is achieved in this case by applying the basic arithmetic functions of exponentiation and the logarithmic function. Since the values of the logarithmic function may be retrieved from a table, a complex computation processor is not required to ascertain the reference voltage $U_R$, which saves space and cost.

In step C, the ascertained reference voltage $U_R$ is compared with the resulting voltage U. In a non-limiting example, a differential voltage ΔU may be calculated for this purpose. The result of this comparison may be fed back to step A such that the predetermined current $I_V$ may be adjusted accordingly.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

The invention claimed is:

1. A fuel cell stack comprising:
a control device being configured to actuate the fuel cell stack in accordance with a desired predetermined current (IV), to measure a resulting voltage (U), and to compare the resulting voltage (U) with a reference voltage (UR), the predeteiztiined current (IV) being dependent on the reference voltage (UR) via a sum of at least two exponential functions whose argument in each case contains the reference voltage (UR), and
the control device being configured to ascertain the reference voltage (UR) by approximately reversing a correlation between the predetermined current (IV) and the reference voltage (UR) using an iterative approximation algorithm.

2. The fuel cell stack of claim 1, wherein the control device is configured to ascertain the reference voltage (UR) by applying arithmetic operations of addition, subtraction, multiplication, division, and exponentiation and to retrieve values of logarithms from a table.

3. The fuel cell stack of claim 1, wherein the control device is configured to ascertain a malfunction and/or degradation of the fuel cell stack from a deviation between the resulting voltage (U) and the reference voltage (UR).

4. The fuel cell stack of claim 3, wherein the control device is configured to change actuation of the fuel cell stack to reduce the deviation between the resulting voltage (U) and the reference voltage (UR).

5. The fuel cell stack of claim 1, wherein the control device is configured to operate the fuel cell stack using the predetermined current (IV) at an operating point at which degradation of the fuel cell stack is minimized.

6. The fuel cell stack of claim 3, wherein the control device is configured to change actuation of the fuel cell stack in such a way that an electrical power that is output by the fuel cell stack remains constant at a same specification, irrespective of the degradation.

7. A fuel cell vehicle comprising the fuel cell stack of claim 1.

8. A fuel cell vehicle comprising the fuel cell stack of claim 1.

9. A control device
configured:
to actuate a fuel cell stack in accordance with a desired predetermined current (IV), to measure the resulting voltage (U), and to compare the resulting voltage (U) with a reference voltage (UR), the predetermined current (IV) being dependent on the reference voltage (UR) via a sum of at least two exponential functions whose argument in each case contains the reference voltage (UR), and
to ascertain the reference voltage (UR) by approximately reversing a correlation between the predetermined current (IV) and the reference voltage (UR) using an iterative approximation algorithm,
the control device being a fuel cell control device.

10. The control device of claim 9, wherein the control device is configured to ascertain the reference voltage (UR) by applying arithmetic operations of addition, subtraction, multiplication, division, and exponentiation and to retrieve values of logarithms from a table.

11. The control device of claim 9, wherein the control device is configured to ascertain a malfunction and/or degradation of the fuel cell stack from a deviation between the resulting voltage (U) and the reference voltage (UR).

12. The control device of claim 11, wherein the control device is configured to change actuation of the fuel cell stack to reduce the deviation between the resulting voltage (U) and the reference voltage (UR).

13. The control device of claim 9, wherein the control device is configured to operate the fuel cell stack using the predetermined current (IV) at an operating point at which degradation of the fuel cell stack is minimized.

14. The control device of claim 11, wherein the control device is configured to change actuation of the fuel cell stack in such a way that an electrical power that is output by the fuel cell stack remains constant at a same specification, irrespective of the degradation.

* * * * *